Sept. 29, 1942.   W. DEISSNER   2,297,204
PROCESS FOR THE MANUFACTURE OF SLIDABLE RUBBER
Filed April 11, 1939
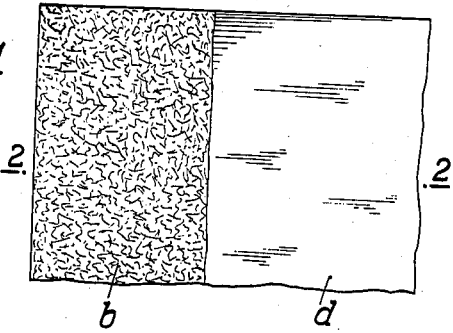
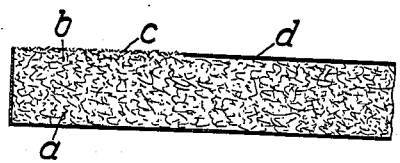
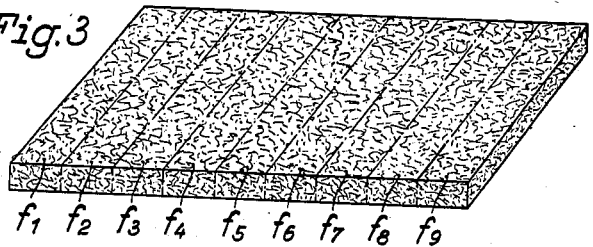
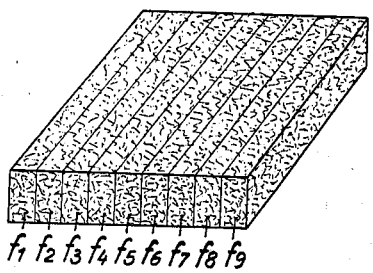
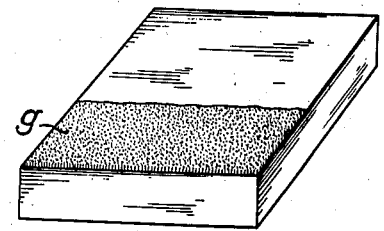
Inventor:
Wilhelm Deissner
by his Agent:
Karl L. Schiff Patented Sept. 29, 1942

2,297,204

UNITED STATES PATENT OFFICE 2,297,204

PROCESS FOR THE MANUFACTURE OF SLIDABLE RUBBER

Wilhelm Deissner, Berlin-Lichterfelde, Germany; vested in the Alien Property Custodian Application April 11, 1939, Serial No. 267,351
In Germany February 5, 1938

1 Claim. (Cl. 18—47.5)

This invention relates to a process for the manufacture of a slidable antifrictional technical rubber for use, for example, for window guides, pneumatic mail containers and so forth. According to the invention the outer surface of the rubber which is mixed with fibres is removed. Preferably a soft rubber which contains more than 25% of fibres is used.

According to a further feature of the invention, the fibres may be substantially at right angles to the surface of the rubber which is made slidable, that is to say may extend from the surface like the bristles of a brush. This result can be obtained in accordance also with the invention, for example, by cutting a rolled or extracted rubber sheet mixed with fibres into narrow strips corresponding to the thickness of the rubber desired and joining the individual strips together in such a manner that the cut surfaces together form the new outer surface and thereafter vulcanising the strips together. After the vulcanising, the continuous rubber layer which is formed is removed, whereupon the fibres lie substantially at right angles to the outer surfaces of the sheet formed and stand out like the bristles of a brush.

The invention accordingly also consists in a slidable antifrictional technical rubber composed of vulcanised soft rubber mixed with fibres the outer skin of which is removed.

The invention resides also in a slidable rubber, the essential feature of which is that it is provided with fibres extending approximately at right angles, like the bristles of a brush, to the slidable surface.

Finally, the invention consists also in a soft rubber mixed with fibres which is composed of individual strips which correspond to the thickness of the desired product and are so assembled that the cut surfaces formed on making the strips lie on the outside of the finished product.

By means of the invention there is obtained a rubber which can be used for all purposes for which a rubber which is slidable or has an agreeable grip or feel is required. The invention is therefore not limited in any way to the uses previously mentioned. In addition to its slidability the rubber also has a warm, agreeable velvet-like feel which is also of importance, when the rubber is to be used for making, for example, rubber toys, rubber clothing, rubber shoes and rubber belts and the like.

When the rubber is formed from strips the rubber becomes elastic again, so that after the process of the present invention has been carried out an elastic, fibre-containing, slidable rubber is obtained.

The rubber filled with fibres of which the outer skin is removed presents a material which slides well, even if the fibres run more or less parallel to the outer surface. By placing the fibres in such a manner that they lie more or less at right angles to the outer surface there is produced a rubber material which has a velvet-like appearance and feel.

When using the material of the invention for a window guide, it need not be provided with a separate textile covering of plush, felt or the like. The same holds good when the rubber of the invention is used for other purposes.

A particularly important purpose for which the rubber of the present invention can be used is for the sliding rings of pneumatic mail containers.

A method for producing a slidable rubber article according to my invention is as follows:

Soft rubber is in a well known manner mixed with fibres of cotton or the like, then brought in sheet form of say 3 or 4 mm. thickness and then vulcanized. While vulcanizing an outer surface is produced on the sheet which consists of more or less pure rubber. This outer surface is then removed by grinding disks or grinding rolls on those points which are to be made slidable. By the grinding the fibres come to and project from the outer surface of the article and make it slidable.

According to a preferred method the said vulcanized sheet preferably after removing the outer layer of pure rubber is cut into small strips of equal breadth of say 3 to 4 mm. These strips are associated so as to form with their cut surfaces new surfaces of a sheet the thickness of which corresponds to the breadth of the cut strips. These strips are vulcanized together whereby the outer surfaces of the new sheet are again covered with a layer of pure rubber. When this layer is also removed by grinding or the like the fibres lie square to the outer surface of the article and project from the surface in a brush-like manner giving the article a smooth slidable character. The fact that the fibres project from the ground surfaces is due to the fact that the grinding disks do not affect the fibres in the same degree as the rubber and take away more from the rubber than from the fibres.

Some embodiments of the invention are disclosed in the attached drawing in which Fig. 1 is a plan view of a rubber plate according to the invention, Fig. 2 is a section along line 2—2 of Fig. 1, Fig. 3 is a perspective view of a plate made of rubber which is mixed with fibres and in which the dotted lines indicate cutting planes, Fig. 4 is a perspective view of a plate composed of strips cut out according to Fig. 3, Fig. 5 is a perspective view of the same plate as shown in Fig. 4 after the strips being vulcanized together and after a further treatment of the plate.

The different figures are not supposed to be on natural size and they are not drawn to the same scale.

In Figs. 1 and 2 the vulcanized rubber plate which is mixed with fibres is designated as a whole by the letter $a$. The upper rubber skin $d$ is shown to have been removed in the region $b$ by grinding or the like, so that fibres $c$ project irregularly beyond the outer surface of the plate. After the removal of the rubber skin $d$ from the entire plate, the plate has been found to possess a great slidability with respect to adjacent bodies which may rest against it.

Figure 3 shows a plate made of rubber and fibres which is cut along the dotted lines into strips $f$—$1$ to $f$—$9$. These strips are then placed on edge and put together in position as shown in Fig. 4. Hereupon the strips $f$—$1$ to $f$—$9$ are vulcanized together in their new relative position. During this vulcanizing procedure a thin rubber skin is again formed on the outer surface of the plate. After grinding off or removing otherwise this rubber skin, the fibres project outwardly beyond the surface of the main body of the plate, more or less in a direction vertical to such surface and parallel to each other as it is indicated at $q$ in Fig. 5.

I claim:

In a method for producing an antifrictional technical article made of vulcanized soft rubber which is mixed with fibres, producing of a sheet of rubber mixed with fibres, cutting the sheet into strips, associating these strips so as to form with their cut-surfaces new surfaces of a sheet the thickness of which corresponds to the breadth of the cut strips, vulcanizing together these strips and removing the layer of rubber originated by said vulcanizing on those parts of the strips which are intended to be slidable.

WILHELM DEISSNER.